US006835133B2

(12) United States Patent
Baerlocher et al.

(10) Patent No.: US 6,835,133 B2
(45) Date of Patent: Dec. 28, 2004

(54) SLOT-TABLE GAME APPARATUS AND METHOD OF PLAYING SLOT-TABLE GAME

(75) Inventors: Anthony J. Baerlocher, Reno, NV (US); Jean M. Brossard, Reno, NV (US); Chauncey W. Griswold, Reno, NV (US); Robert A. Luciano, Jr., Reno, NV (US); Don C. Stephan, Carson City, NV (US)

(73) Assignee: IGT, Reno, NV (US)

(*) Notice: Subject to any disclaimer, the term of this patent is extended or adjusted under 35 U.S.C. 154(b) by 90 days.

(21) Appl. No.: 09/886,751

(22) Filed: Jun. 21, 2001

(65) Prior Publication Data

US 2002/0022510 A1 Feb. 21, 2002

Related U.S. Application Data

(62) Division of application No. 08/976,165, filed on Nov. 21, 1997, now Pat. No. 6,435,970.

(51) Int. Cl.[7] .................... A63F 13/00
(52) U.S. Cl. .................... 463/20; 463/16; 273/138.2
(58) Field of Search .................... 463/1, 16–22, 463/12, 13, 32, 34, 46; 273/138.2, 143 R, 274

(56) References Cited

U.S. PATENT DOCUMENTS 4,440,457 A 4/1984 Fogelman et al.
4,813,675 A 3/1989 Greenwood
4,889,339 A * 12/1989 Okada .................... 463/20
4,936,580 A 6/1990 Kaminkow
5,193,807 A 3/1993 Schilling et al.
5,276,524 A 1/1994 Inoue et al.
5,342,047 A * 8/1994 Heidel et al. .................... 463/29
5,382,025 A 1/1995 Sklansky et al.
5,393,067 A 2/1995 Paulsen et al.
5,472,194 A 12/1995 Breeding et al.
5,536,082 A 7/1996 Ritchie et al.
5,584,763 A * 12/1996 Kelly et al. .................... 463/4
5,630,586 A * 5/1997 Lowden .................... 463/20
5,882,261 A 3/1999 Adams
5,924,926 A 7/1999 Brown
5,927,714 A 7/1999 Kaplan
6,004,208 A * 12/1999 Takemoto et al. .................... 463/20
6,068,553 A 5/2000 Parker
6,073,930 A 6/2000 Jones et al.
6,089,980 A 7/2000 Gauselmann

FOREIGN PATENT DOCUMENTS

GB 2226907 7/1990

* cited by examiner

*Primary Examiner*—Jessica Harrison
*Assistant Examiner*—Aaron J. Capron
(74) *Attorney, Agent, or Firm*—George H. Gerstman; Seyfarth Shaw LLP

(57) ABSTRACT

An apparatus and method for playing a table game is disclosed. The apparatus comprises a base, a table-top, and a payline display proximate the table-top. The table-top is adjustable into first and second positions relative to the base. The table game is intended to be played when the table-top is in its first position.

15 Claims, 8 Drawing Sheets

SLOT-TABLE GAME APPARATUS AND METHOD OF PLAYING SLOT-TABLE GAME

This is a divisional application of application Ser. No. 08/976,165, filed Nov. 21, 1997, now U.S. Pat. No. 6,435,970.

Cross-reference is made to U.S. Pat. No. 5,630,586, issued Apr. 16, 1996, and any continuing application thereof, incorporated herein by reference.

FIELD OF THE INVENTION

The present invention relates generally to casino gaming and, more particularly, to casino gaming devices.

BACKGROUND INFORMATION

Generally, casinos include at least two types of games: (1)slot machines; and, (2) table games. Slot machine games (including electronic slot machines) are typically played by a single individual interacting only with a slot machine, not with any other persons or only a part of a game. Table games (such as blackjack, poker and the like) typically include interaction between a dealer and/or other players. Typically, patrons of casinos focus on one or the other of the two main types of games at any given time. Both types of games, however, are important revenue generators for the casino.

To appeal to both slot machine patrons and table game patrons, and to provide further entertainment variety for all casino patrons, it is desirable to develop a game which combines certain aspects of slot machines with aspects of table games.

SUMMARY OF THE INVENTION

One embodiment of the invention uses an apparatus having a base, a table-top, and a payline display preferably proximate the table-top. The table-top is such that it is adjustable into first and second positions relative to the base. The table game is intended to be played when the table-top is in its first position, with the second position facilitating repair, maintenance, game conversion and the like.

One embodiment of the invention includes a plurality of player stations and one or a plurality of payline displays. At least two of the plurality of player stations are remotely located from one another. The payline displays are situated such that at least one payline display is visible to a player playing at each of the plurality of player stations.

A method of playing a casino game is also disclosed herein. According to one embodiment, the method includes the steps of (1) providing a payline display having a plurality of display segments bearing a predetermined number of indicia; (2) providing a player spin/stop button; (3) enabling the player spin/stop button for a first time; (4) depressing the enabled spin/stop button to cause at least some of the plurality of display segments to "spin," wherein one or more, but preferably not all, of the plurality of display segments stop spinning after the enabled spin/stop button is depressed for the first time; (5) enabling the player spin/stop button for a second time; and, (6) depressing the enabled spin/stop button for the second time to cause at least some of the remainder of the plurality of display segment to stop spinning.

Other objects, features and advantages of the invention will be apparent from the following specification taken in conjunction with the following drawings.

DETAILED DESCRIPTION OF THE PREFERRED EMBODIMENT

Figure 1:
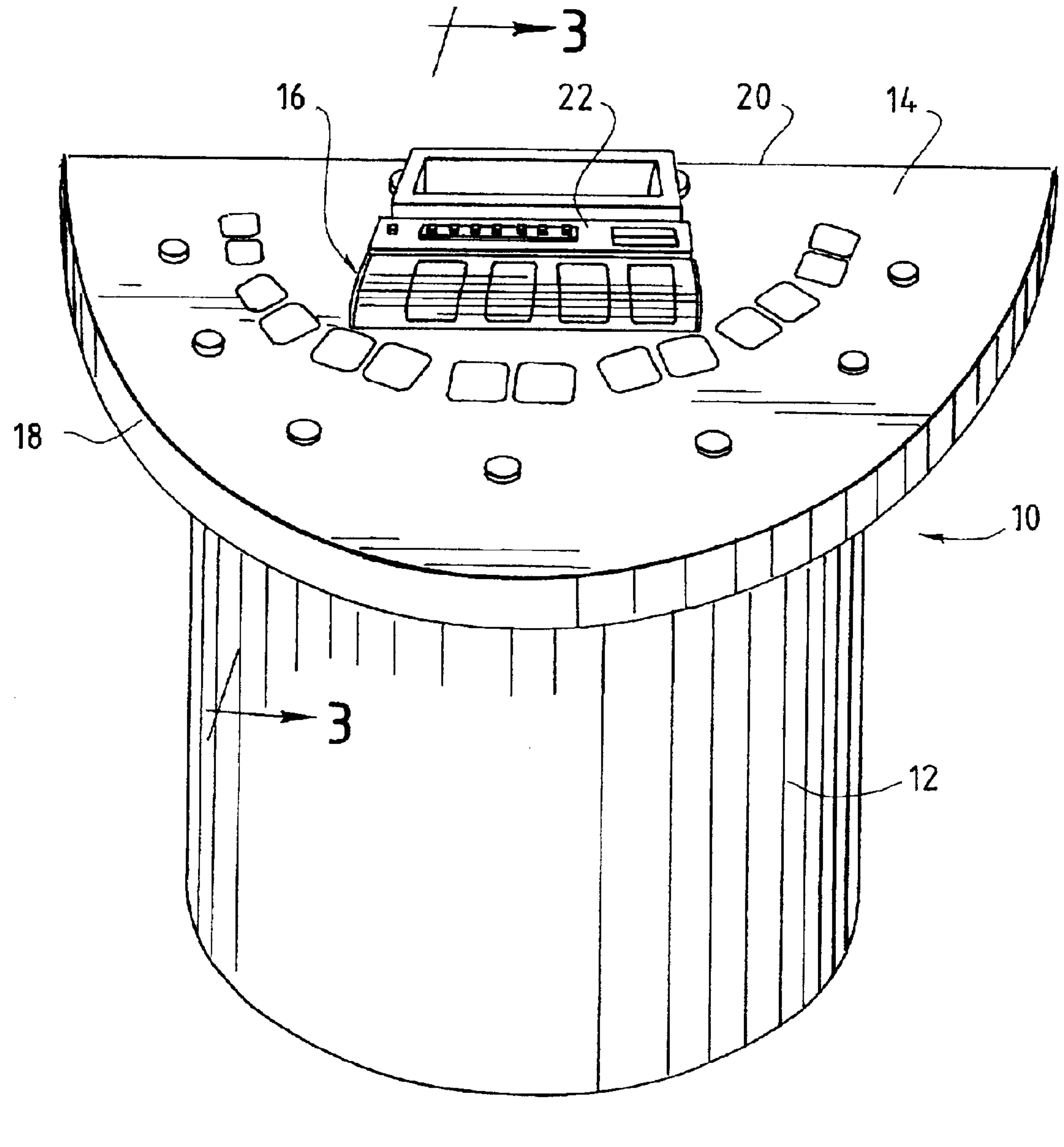
FIG. 1 is a perspective view of a slot-table apparatus according to an embodiment of the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
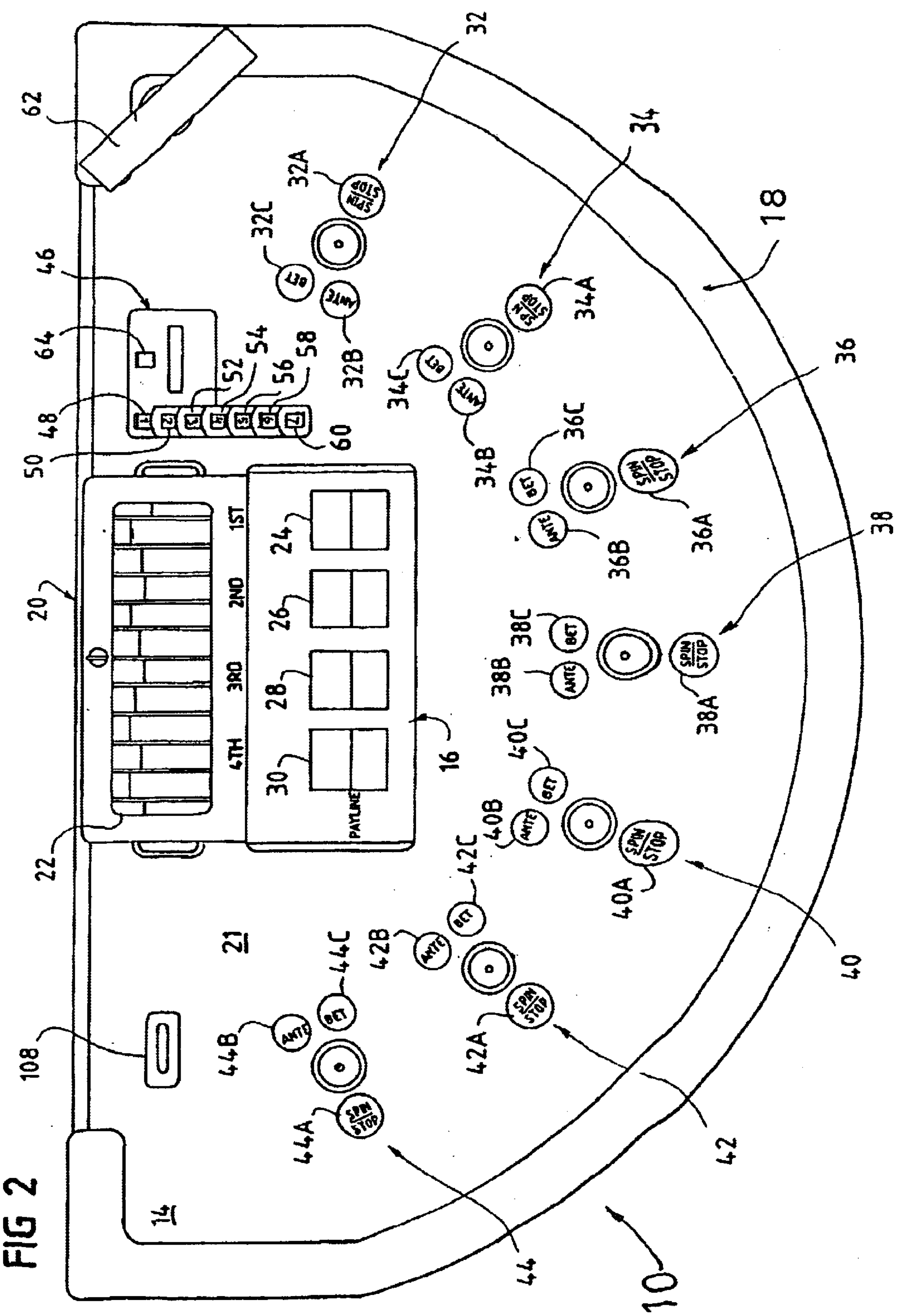
FIG. 2 is a top plan view of a slot table apparatus according to an embodiment of the present invention.

According to one embodiment, the slot table game apparatus, generally designated 10, is illustrated in FIGS. 1 and 2. The apparatus comprises a base 12, a table-top 14 and a payline display 16.

As shown in FIGS. 1 and 2, the table-top 14 is supported by the base 12. The table-top 14 has a generally arcuate edge 18 and a straight edge 20, and is covered by a covering 21 preferably made from colored felt, but which may be made of any suitable material. A dealer (not shown) is normally positioned near the center of the straight edge 20 of the table-top 14 adjacent to a removable token tray 22 used, e.g., for storing chips.

Still referring to FIG. 2, the payline display 16, which lies adjacent the table-top 14, is divided into first, second, third and fourth display segments 24, 26, 28, 30, each of which is capable of displaying one of a predetermined number of indicia. Together, the first, second, third and fourth display segments 24, 26, 28, 30 are used to display a combination of indicia along a "payline." It should be understood that the number of display segments and the predetermined number of indicia may vary.

In the embodiment shown, the first, second, third and fourth display segments 24, 26, 28, 30 of the payline display 16 are comprised of extra-wide slot-machine reels which bear the predetermined number of indicia. It should be understood that the payline display 16 may also include electronic display devices such as a cathode-ray tube, a light-emitting diode array, a liquid crystal display or an electroluminescent display; and, that such displays would also include corresponding display segments.

As described above and shown in FIGS. 1 and 2, the payline display 16 is located adjacent to the table-top 14. As will be understood, the payline display 16 may be otherwise located so long as it is visible to the players of the game. For example, each player station (described below) may include a separate payline display.

First, second, third, fourth, fifth, sixth and seventh player stations 32, 34, 36, 38, 40, 42, 44 are located about the periphery of the table-top 14 along its arcuate edge 18. It should be understood that the number of player stations may vary from table-to-table depending upon a number of factors including the desired spacing between players, the desired size of the table and the like.

The player stations 32–44 each include a spin/stop button 32A–44A, an ante area 32B–44B and a bet area 32C–44C. In the depicted embodiment, the ante areas 32B–44B and bet areas 32C–44C are demarcated by designations on the covering 21 of table-top 14. Each of the spin/stop buttons 32A–44A is physically coupled to the table-top 14 and, preferably, includes a controllable illumination device, such as an incandescent bulb, therein. A progressive bet area (not shown) may also be included. For each of the bet areas, a coin detector may be used to ensure that a bet has been properly placed. Such a device is disclosed in U.S. Pat. No. 5,393,067 to Paulsen et al., assigned to International Game Technology, and incorporated herein by reference.

A dealer control station 46 lies proximate the removable token tray 22 and includes first through seventh enable buttons 48, 50, 52, 54, 56, 58, 60 which correspond with the first through seventh player stations 32–44, respectively. The first through seventh enable buttons 48–60 preferably include a controllable illumination device, such as an incandescent bulb, therein and are used to activate their corresponding spin/stop buttons 32A–44A, upon being depressed by the dealer.

According to one method of play, to be eligible to play in a round, each player places his ante (initial bet) in the ante area 32B–44B corresponding with his player station 32–44. The amount of the ante for each table is set by the house.

Once all the antes have been placed by the players interested in participating in the round, the dealer depresses one of the enable buttons 48–60 which activates, and preferably illuminates, a corresponding player's spin/stop button 32A–44A. To assist in the explanation of the game, it will be assumed that the dealer depressed enable button 48, which activates spin/stop button 32A (i.e., the first player's spin/stop button).

Once the first player's spin/stop button 32A is activated and illuminated, the first player then depresses it which causes first, second, third and fourth display segments 24, 26, 28, 30 to "spin." Sometime thereafter, the first and second display segments 24, 26 automatically stop and each displays indicia. The stop positions for the display segments 24, 26 are randomly determined in any of a number of fashions well-known in the slot-machine art.

At this point, all of the players have an opportunity to increase the amount wagered above that of the initial ante by placing a bet in their corresponding bet areas 32C–44C. A player may bet nothing or may bet up to a specified multiple of the ante depending upon the limits for the table as set by the house. While the players are betting, the third and fourth display segments continue to "spin."

In one embodiment, while the first, second, third and fourth display segments 24, 26, 28, 30 are spinning, the enable button of the player whose spin button has been activated flashes. After the first and second display segments 24, 26 stop, the first player's enable button appears continuously illuminated again.

In this case, while the first, second, third and fourth display segments 24, 26, 28, 30 were spinning, enable button 48 flashed. After the first and second display segments 24, 26 stopped, enable button 48 appeared continuously illuminated again.

Once all of the bets have been placed, the dealer again depresses the same player's illuminated enable button (i.e., enable button 48), which again activates and illuminates the player's spin/stop button (i.e., 32A). The player then depresses his spin/stop button which causes the third and fourth display segments 28, 30 to stop.

In the described embodiment, a flashing button generally indicates a "standby" condition while a steadily-illuminated button indicates the button may be depressed. Other indicators of these or other button conditions can be used such as colors, sounds, indicia and the like.

The winning combination or payline, comprised of the combination of the indicia of each of the first, second, third and fourth display segments 24, 26, 28, 30, is then displayed on the payline display 16. All wagers are then reconciled.

More specifically, in the absence of a winning combination, the wagers are reconciled by the dealer taking the wagering tokens within the ante areas 32B–44B and the bet areas 32C–44C. When there is a winning combination, all bets and wagers are reconciled by the dealer making a payout to the players. In one embodiment, the winning combinations and the payouts are listed on a lighted paytable 62.

To begin the next round, players place their antes in their corresponding ante areas 32B–44B. The dealer then selects the next player to spin/stop. While the dealer is free to choose the order in which players are given the opportunity to spin/stop, it is preferred, in one embodiment, that the dealer rotates the ability to spin/stop successively from player-to-player. To assist the dealer in this endeavor, the enable button of the player who had the ability to spin/stop in the preceding round (i.e., enable button 48) flashes until the dealer depresses the enable button of a player who will have the ability to spin/stop in the current round. Other past-player indicators can be used such as colors, sounds, a separate display screen and the like.

In this particular embodiment of the device, the same player who "spins" the display segments 24–30 is required to stop them. In other words, in this embodiment, the ability to stop the segments may not be passed to another player, during a round.

To account for those instances in which a player who has "spun" the display segments 24–30 fails or refuses to stop them, e.g. after a predetermined period of time has elapsed, the dealer control panel 46 is equipped with a dealer override button 64. In cases in which none of the players wish to spin, the dealer override button 64 may also be used to perform the initial spinning of the display segments 24–30.

Finally, if the dealer activates a player's spin/stop button by depressing the player's enable button on accident or mistake, he may deactivate it by depressing the player's enable button a second time. To prevent the dealer from accidentally spinning by accidentally depressing the dealer override button 64, a time delay is associated with the dealer override button 64 which allows the dealer an opportunity to again depress the dealer override button 64 within a predetermined period of time to deactivate it. A warning display or sound may be output during the delay time.

Figure 3:
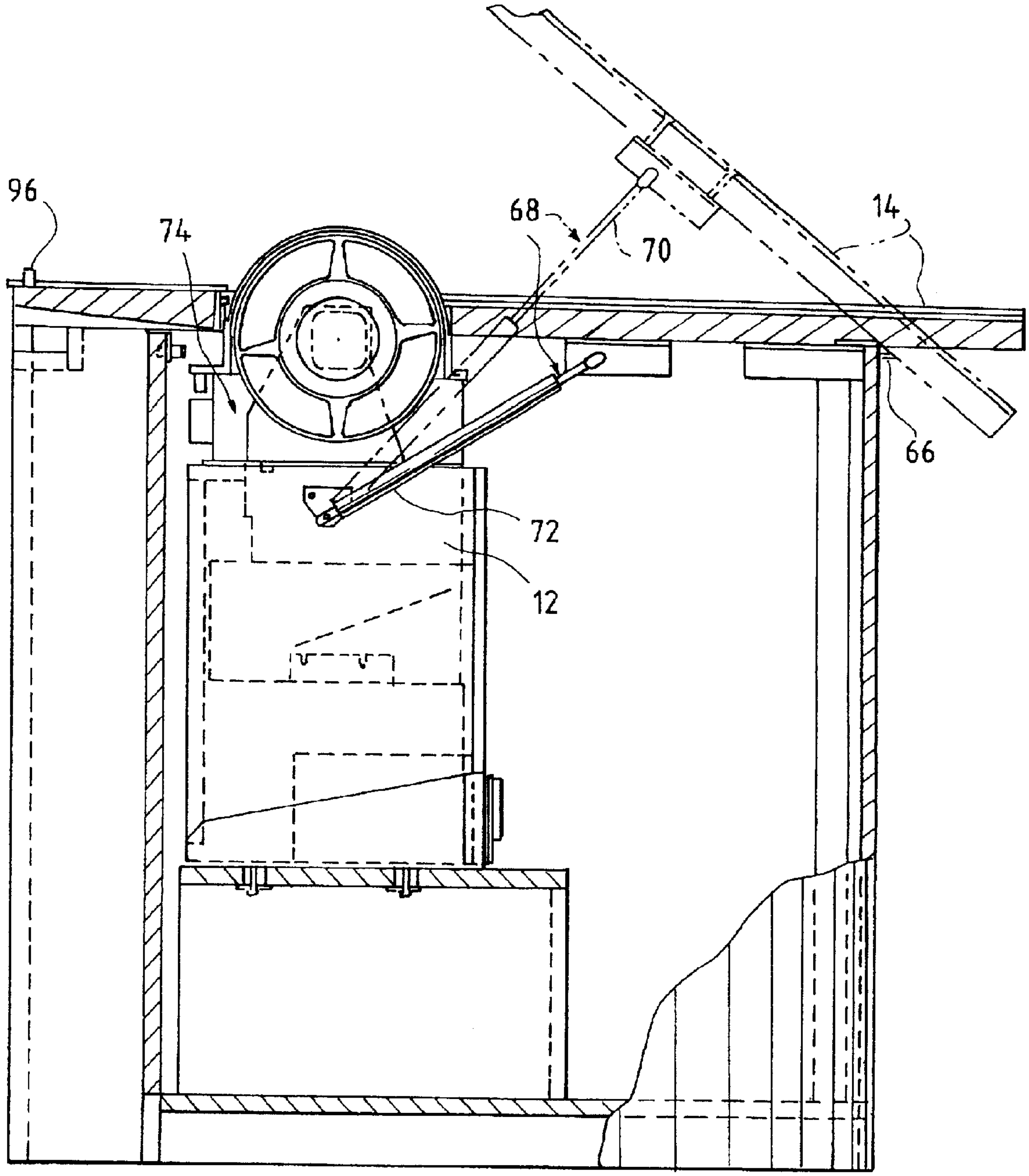
FIG. 3 is a cross-sectional view of the apparatus shown in FIG. 2 taken along line 3—3.

Referring now to FIGS. 1 and 3, the table-top 14 is adjustable from a first position (FIG. 1) to a second position (FIG. 3). As will be understood from the discussion above, the table-game is intended to be played when the table-top 14 is in its first position.

In the embodiment of FIG. 3, a portion of the display 16 protrudes through an opening in the table-top 14, to project upward above the surface of the table-top 14. While such projection facilitates display visibility, it prevents lateral removal of the display while the table-top is in the first position.

As shown in FIG. 3, a hinge 66 provides a mechanism by which the table-top 14 can pivot from its first position to its second position. Furthermore, referring to both FIGS. 3 and 4, a pair of gas shock absorbers 68, 68 having first ends 70, 70 and second ends 72, 72 are provided to control the movement of the table-top 14 between first and second positions. The first ends 70, 70 of the shock absorbers 68, 68 are connected to the table-top 14, while their second ends 72, 72 are connected to the base 12.

The hinge 66 and the shock absorbers 68, 68 may be configured such that the table-top 14 is removable from the base 12 to permit substitution of other table-tops (not shown) for the present one, so that different games, such as blackjack or roulette, can be played using the same base 12.

Figure 4:
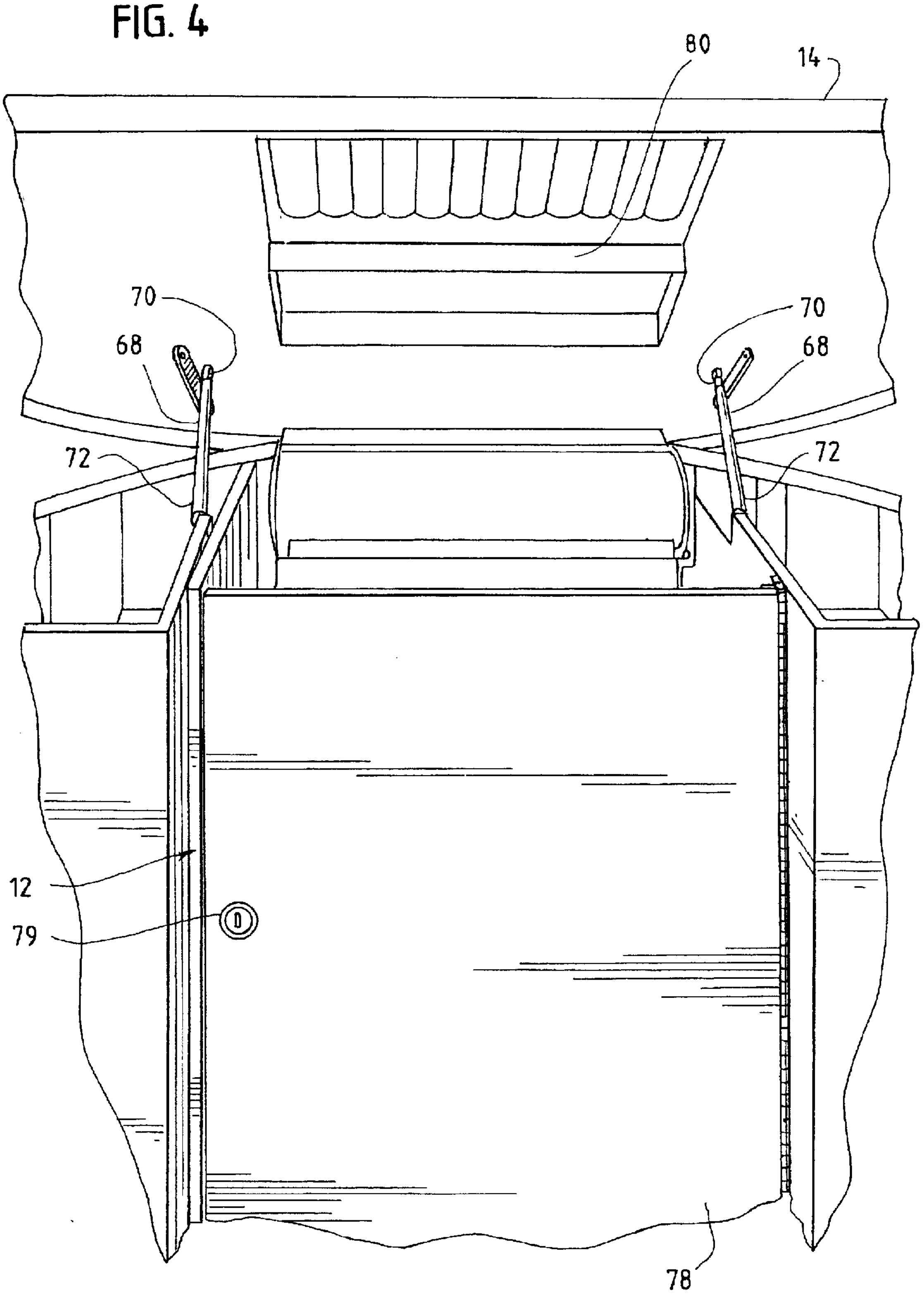
FIG. 4 is a rear elevational view of the apparatus of FIG. 2 showing the table-top in its second position and the door of the interior region closed.
Figure 5:
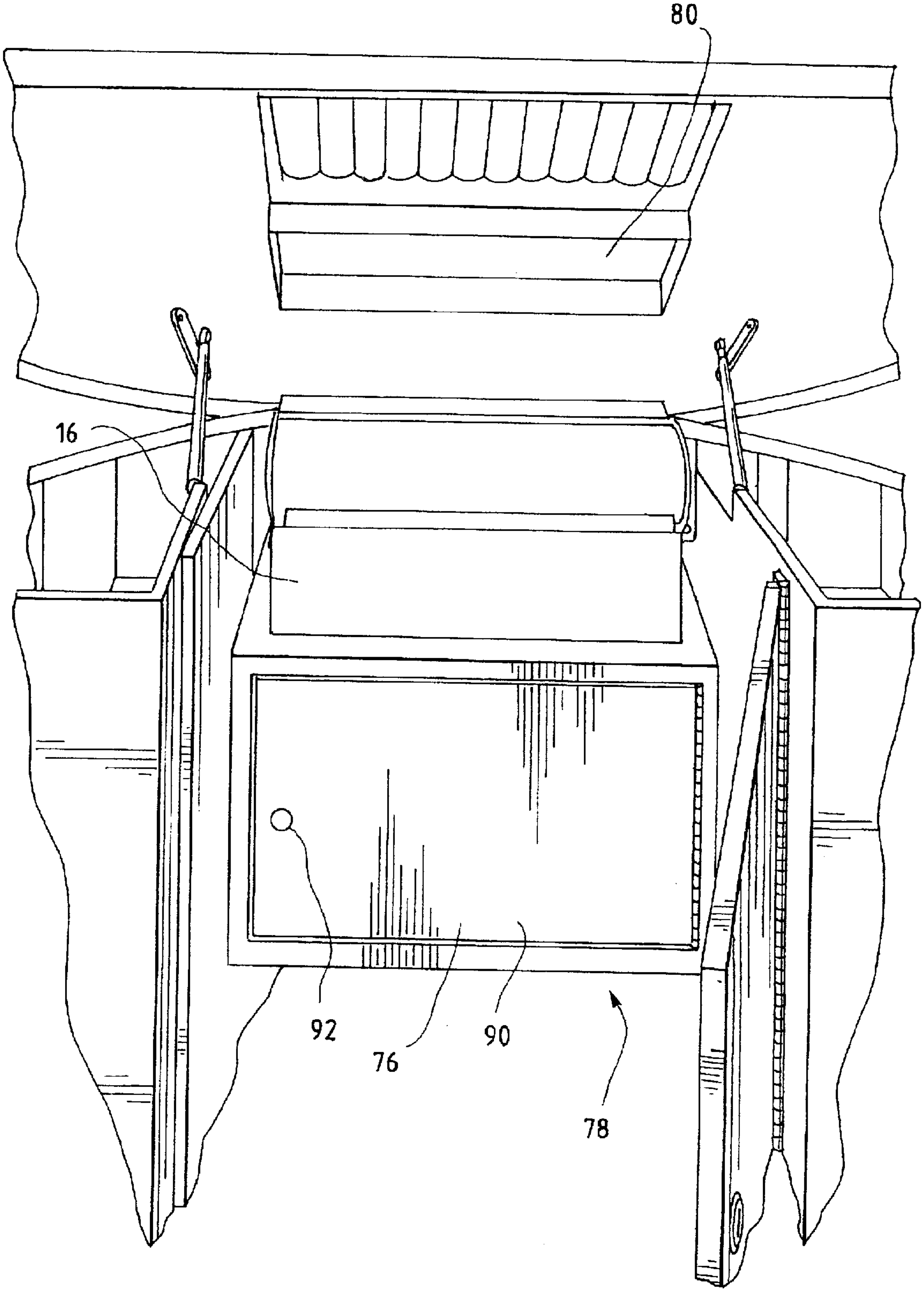
FIG. 5 is a rear elevational view of the apparatus of FIG. 2 showing the table-top in its second position and the door of the interior region open.

As will be understood by studying FIGS. 4 and 5, the base 12 has an interior region 74 in which a portion of the payline display 16 (shown in the form of a slot-machine reel) rests. The interior region 74 of the base 12 also houses an electronic control module 76 which is electronically coupled to the payline display 16, the dealer control station 46 and the player spin/stop buttons 32A–44A. It is the electronic control module 76 which operatively controls the electronics of the game.

While the electronic control module 76 is shown to be located completely within the base 12, it may alternatively be at some remote location or located partially within the base 12. The only requirement is that the electronic control module 76 is electronically connected to the display 16, spin/stop buttons 32A–44A, and dealer control station 46.

The payline display 16 and the electronic control module 76 are removable from and insertable into the interior region 74 of the base 12 through a door 78 in the base 12 (see FIGS. 4 and 5). This permits both the payline display 16 and the electronic control module 76 to be easily serviced and/or replaced, if necessary.

As shown in FIG. 4, the door 78 has a lock 79 to restrict access to the interior region 74 of the base 12 and, hence, to both the electronic control module 76 and the display 16.

It is preferred that access to the payline display 16 and the electronic control module 76 be prevented or restricted during normal play configuration, i.e., when the table-top 14 is in its first position. In this regard, the display 16 and the electronic control module 76 are preferably connected to one another such that, even if the door 78 were open, movement of the display 16 and the electronic control module 76 would be prevented when the table-top 14 was in its first position due to the fact that display 16 protrudes through aperture 80 in the table-top 14 and is restricted thereby.

Figure 6:
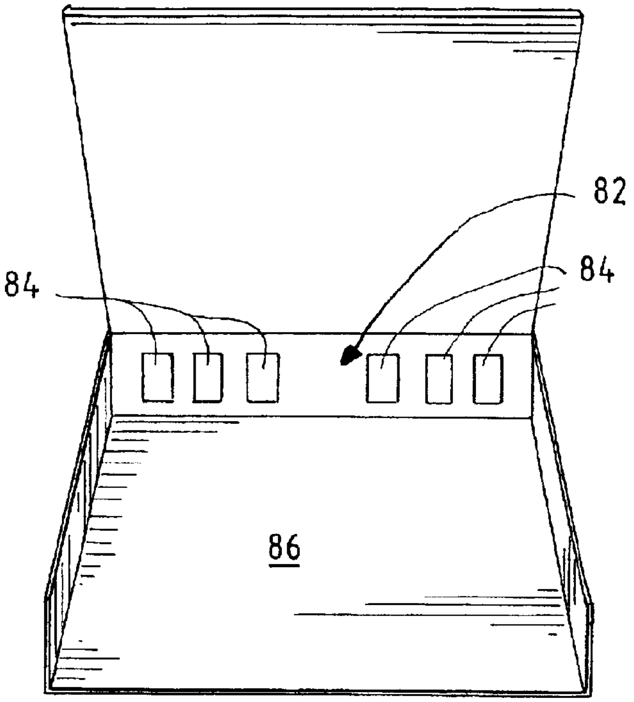
FIG. 6 is a rear elevational view of the interior region of the base of a table slot apparatus, with the electronic control module removed therefrom.

FIG. 6 shows the interior region 74 of the base 12 with the display 16 and electronic control module 76 removed therefrom. The interior region 74 includes an interface 82, in the form of a plurality of connectors 84, which is used to electronically couple the electronic control module 76 to the dealer control station 46 and the spin/stop buttons 32A–44A. As for the electronic control module 76 and the display 16, in the depicted embodiment, they are electrically and physically connected to one another. The electronic control module 76 is configured so that the when it is slid into position in the interior region 74 through the front door 78 and along surface 86, it mates with the interface 82.

Figure 7:
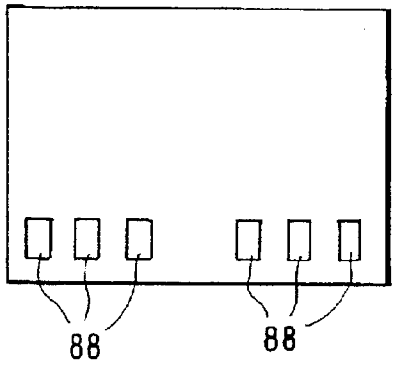
FIG. 7 is a side elevational view of an electronic control module for use in connection with a table slot apparatus, which connects to an interface of the interior region.

Specifically, as shown in FIG. 7, electronic control module 76 includes connection ports 88 which are aligned with and mate with connectors 84 when the electronic control module 76 is properly positioned within the interior region 74. It should also be understood that the electronic control module 76 is automatically uncoupled from the connectors 84 when it is withdrawn from the interior region 74 of the base 12.

Figure 8:
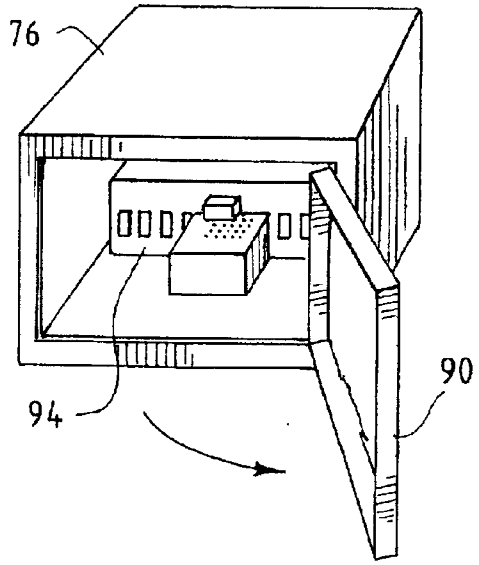
FIG. 8 is a perspective view of the electronic control module of FIG. 7 with its door opened.

Referring back to FIG. 5, the electronic control module 76 includes a door 90 having a lock 92. When unlocked and opened, the door 90 permits access to the electronic control module's electronic components 94 (see FIG. 8) so that the components 94 can be serviced or replaced.

To prevent tampering with the display 16 or the electronic control module 76, a sensor 96 (shown in FIG. 3), located between the base 12 and the table-top 14, is used to determine whether the table-top 14 is in its first position or not. If the table-top 14 is not in its first position, conventional circuitry (not shown) associated with the sensor 96 provides an audible or visual notification of same via an indicator 98, such as a speaker, and/or prevents normal game operation.

Figure 9:
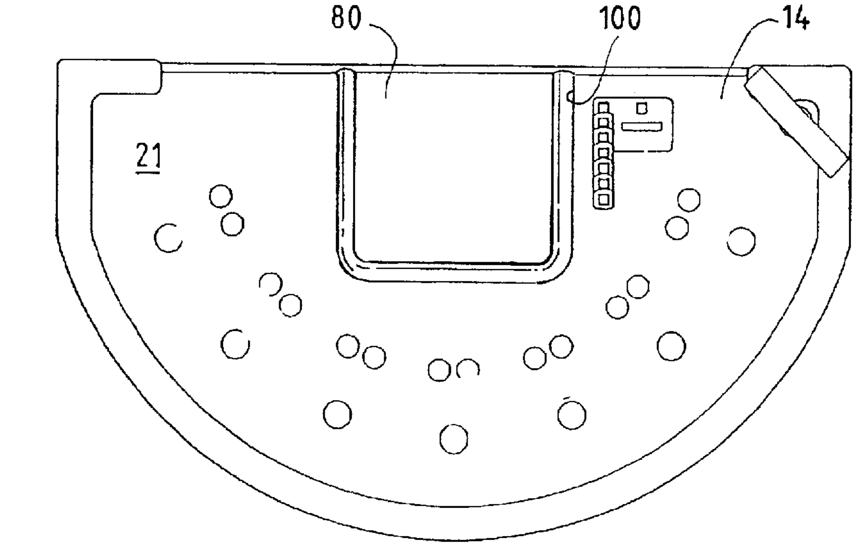
FIG. 9 is a top plan view similar to FIG. 2 with the payline display and the removable token tray removed therefrom.

Some additional features of the table-top will now be discussed. With reference to FIGS. 2 and 9, the table-top 14 includes an aperture 80 through which the display 16 protrudes and in which the removable token tray 22 rests. FIG. 9 shows the table-top 14 with both the display 16 and the removable token tray 22 removed.

Because it is common to serve beverages to players in casinos and because players may spill such beverages onto the table-top 14, a removable trough 100, which surrounds at least a part of the aperture 80, is provided to catch such spills. Accordingly, the trough 100 prevents liquids from entering the interior region of the base 74 through the aperture 80, thus, protecting the electronic control module 76.

As an alternative to, or in addition to, using a trough, a domed plastic shield (not shown) preferably having a watertight seal between it and the table-top 14 may be used to cover the display 16. The disadvantage of such a system is that both vertical and horizontal stackability of table-tops which have been removed from their respective bases may be reduced. Furthermore, a trough may still be required to surround the removable token tray.

In order to keep the playing surface clean, the covering 21 is removable from the table-top 14 so that it can be easily replaced. In one embodiment, the covering 21 is in the form of a felt-covered wood insert shaped and sized to fit within a table-top edge frame. If several of such inserts are kept on hand, a worn-felt insert may be easily replaced with a new (or newly re-felted) insert to reduce or minimize non-productive maintenance time for the table.

Figure 10:
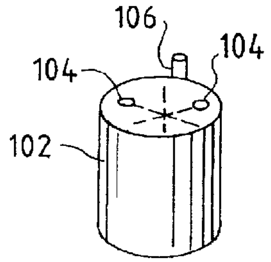
FIG. 10 is a perspective view of a bet area showing a cup having optical sensors therein, according to an embodiment of the present invention.

To prevent players from adding chips to or removing chips from their bet areas 32C–44C at inappropriate times, the bet areas 32C–44C may include cups 102 having optical sensors 104 therein as shown in FIG. 10. As will be understood from the description of the game, the optical sensors 104 are not activated until the dealer activates the spin/stop button of the player in control of spinning/stopping for its second time. In other words, the optical sensor 104 is not activated until just after (1) the first two display segments 24, 26 have stopped, (2) all bets have been made and (3) the dealer depresses the enable button (for example, enable button 48 for the first player) for a second time.

The optical sensors 104 are such that they can detect whether something is being placed in or removed from the cups 102. The optical sensors 104 are associated with conventional electronic circuitry (not shown) which contains an indicator 106 to notify the dealer that something is either being placed in or removed from the cups 102. A separate indicator 106 may be provided for each of the cups 102 or, alternatively, a single indicator 106 may be used for all of the cups 102. Like the other indicators described above, the indicator 106 may be of the audible or visual variety.

In addition to providing ante and bet areas like those shown in FIG. 1 or cups like those shown in FIG. 10, those of ordinary skill in the art will recognize that wagers may also be placed via a coin slot (similar to a slot machine slot), a bill acceptor, a credit card, debit card or betting card reader, a personal recognition device (i.e., a fingerprint, retina scan or voice print) or over a remote link through use of a keyboard or other input device (e.g., employing a password).

Figure 11:
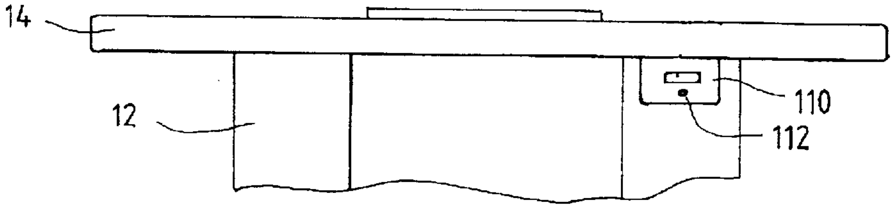
FIG. 11 is a rear elevational view of the apparatus shown in FIG. 2 showing a drop box.

As can be seen by viewing FIGS. 2 and 11, the table-top 14 also includes a slot 108 which leads to a drop box 110. When paper money is collected by the dealer, it is placed into the drop-box 110, via slot 108, for safekeeping. Access to the drop-box 110 is restricted by a drop-box lock 112. Preferably, the drop-box 110 is accessible, e.g., using a lock and key system, even when the table-top 14 is in its first position (i.e., when the table-top 14 is flat), so that the table-top 14 will not have to be moved into its second position when a representative from the house comes to collect the money stowed therein.

Another embodiment of the device may include a progressive game feature. As will be understood by those skilled in the art, a progressive game is one that is played by accumulating all or portions of bets made at localized tables and grouping them into a centralized pool. Players playing at each localized table are eligible to win prizes allocated from the centralized pool merely by playing the localized game. The structure of the apparatus follows.

Figure 12:
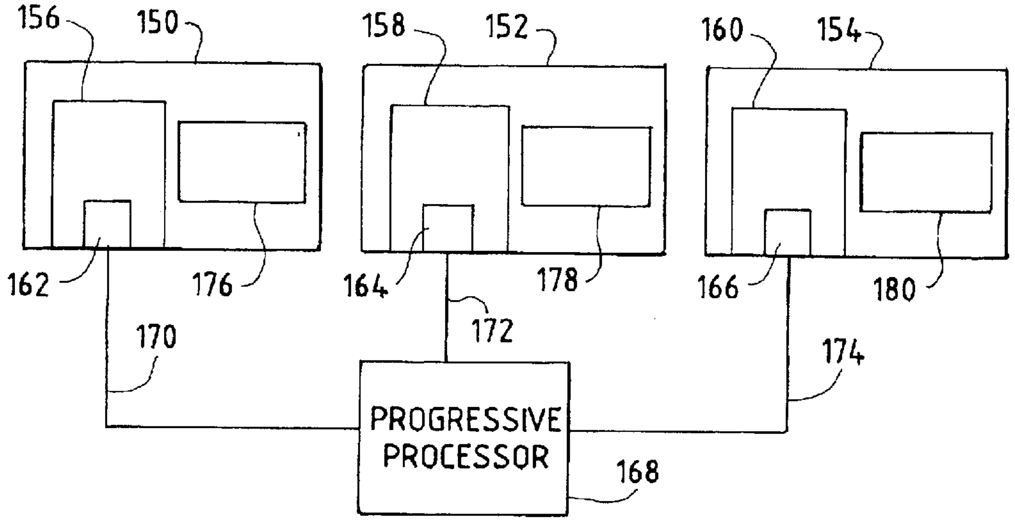
FIG. 12 is a block diagram of a plurality of slot-table apparatuses having a progressive game feature according to an embodiment of the present invention.

The embodiment described herein (shown in block diagram form in FIG. 12) includes first, second and third slot-table game apparatuses (or tables) 150, 152, 154, like those described in connection with FIG. 1. First, second and third tables 150, 152, 154 respectively include first, second and third localized electronics 156, 158, 160 having first, second and third microprocessors 162, 164, 166 therein.

Each of the microprocessors 162, 164, 166 is responsible for determining the total amount wagered at its respective table for the round currently being played and for communicating same to a progressive processor 168 via communications lines such as first, second and third fiber optics interfaces 170, 172, 174, although other conventional communications means may be used.

The progressive processor 168, located at either one of the tables 150, 152, 154 or at a remote location, tabulates the progressive prize amount in the centralized pool upon receipt of the information communicated from the first, second and third microprocessors 162, 164, 166. The progressive processor 168 then communicates the value of the centralized pool and/or one or more prize amounts back to each of the localized tables 150, 152, 154. First, second and third progressive game displays 176, 178, 180 are used to display the value of the centralized pool and/or prize amounts at each table.

One of the players playing in a round may be chosen to win the value of the centralized pool or prize with the winner being chosen randomly, based on the game outcome, or some combination thereof. A progressive game victory light located at a player station like player stations 32–44 of FIG. 2, will preferably be illuminated once someone wins.

For example, it may be decided that 5% of all bets at tables participating in the progressive game are to be contributed into the progressive games' centralized pool. suppose, in a particular round, bets totaling $100 are made at a first table, bets totaling $200 are made at a second table and bets totalling $300 are made at a third table. The total amount added to the centralized pot for that round would, therefore, be $30 ($5+$10+$15). The local-win payout at the first, second and third tables 150, 152, 154 may be adjusted downwards by 5% to cover the shift of funds into the centralized pool. If no one wins the centralized pool at the end of the round, the amount in the centralized pool rolls over into succeeding rounds until a winner is selected.

Figure 13:
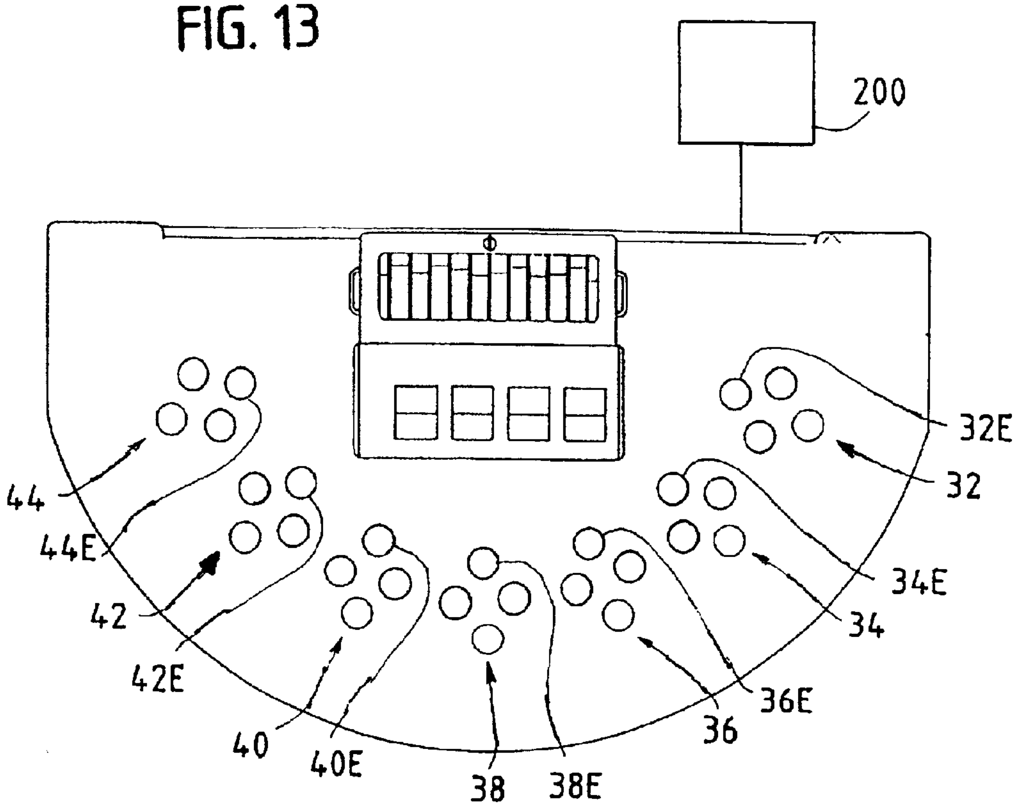
FIG. 13 is a top plan view of a slot table apparatus according to an embodiment of the invention showing a proposition game feature; and, FIG. 14 is a block diagram showing a "virtual" slot-table configuration according to an embodiment of the present invention.
Figure 14:
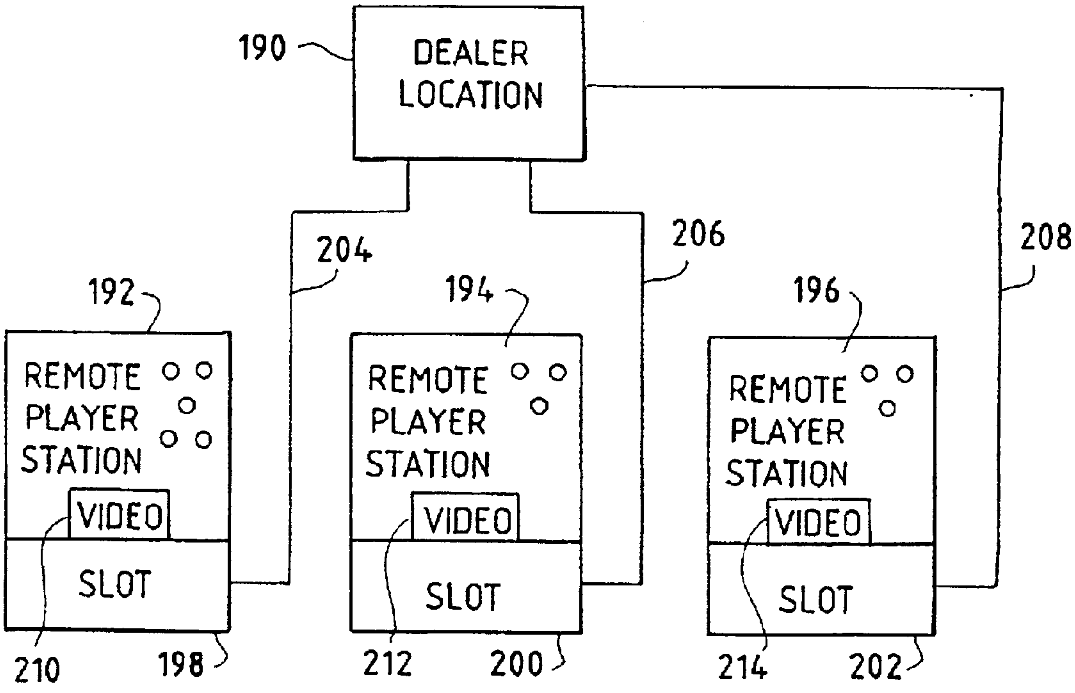

In yet another embodiment of the present invention, the first through seventh player stations 32–44 additionally include proposition game wagering areas 32E–44E as shown in FIG. 13. Prior to the "spinning" of any of the first through fourth display segments 24–30, the players have the option of placing a proposition bet by placing wagering tokens within locations 32E–44E respectively. By making a proposition bet, the player wagers on whether a particular outcome will be displayed on the payline display 16 (e.g., four cherries). The proposition bet could also be such that a certain class of outcomes will be displayed on the payline display 16 (e.g., at least three oranges, etc.).

Optionally, the proposition may be varied from time-to-time (for example, after every "spin" or in response to a player or dealer input). In such case, the table might include a proposition display 200, which is visible to all of the players from their respective player stations 32–44, so that the current proposition being wagered upon would be known to all players.

In yet another embodiment of the device, player stations may be located at remote locations with respect to one another to create a "virtual" slot-table game. In this situation, a dealer located at a dealer location 190 would be advised that a player has stationed himself at one of first, second or third remote player stations 192, 194, 196 and have placed their appropriate antes. This can be done by using first, second and third coin-slot type mechanism 198, 200, 202 which deliver an electronic signal to the dealer at the dealer location via first, second and third communication lines 204, 206, 208 to advise him that the appropriate ante has been placed.

Each player at first, second, and third remote player stations 192, 194, 196 have a player station comprised of an ante area, a bet area and a spin/stop button before him, like those in FIG. 2. First, second and third video screens 210, 212, 214 associated with first, second and third remote player stations 192, 194, 196, respectively, display a slot-table and take the place of an actual table. The game is played identically to the non-virtual game with bets being made, e.g., via card reader or coin-slot type mechanism and winnings being distributed via automatic dispenser, electronic funds transfer or any of the other mechanisms already mentioned above.

While it is believed that providing a game with a live "dealer" present is attractive to players, it is possible to construct a table on which some or all of the functions described as being performed by the dealer are performed automatically or in which the dealer's choices are determined or assisted by displays provided to the dealer.

In light of the above description, a number of advantages of the present invention can be seen. For example, a game has been developed which appeals to both patrons of slot machines as well as patrons of table games. Additionally, the game provides further entertainment variety for all patrons.

Moreover, the table-game apparatus advantageously includes a table-top 14 which is removable from the base 12 to permit substitution of other table-tops, so that different games, such as blackjack or roulette, can be played using the same base 12. Furthermore, the apparatus includes a payline display 16 and an electronic control module 76 which are removable from the interior region 74 of the base 12 so that they may be easily serviced and/or replaced. Even further, the electronic control module 76 is configured so that it advantageously allows automatic uncoupling from connectors 84 inside the interior region 74 of the base 12 when it is withdrawn therefrom.

Another advantage is that the felt covering 21 which covers the table-top 14 is both removable and replaceable to keep the playing surface neat and clean. Along those same lines, the invention also advantageously includes a trough 100 which prevents liquids from entering the interior region 74 of the base 12 through aperture 80 in the table-top 14.

The apparatus also includes optical sensors 104 in cups 102 to prevent players from adding chips to or removing chips from their bet areas 32C–44C at inappropriate times. The invention includes other advantages which, like the above described advantages, will be apparent after reading the present description.

A number of variations and modifications of the invention can be used. For example, a touch screen may be substituted for the spin/stop buttons 32A–44A. Furthermore, instead of all four of the display segments 24, 26, 28, 30 spinning after depression of the spin/stop button, the third and fourth display segments 28, 30 may initially be "blanked out" and then would spin only after the bets were placed and the spin/stop button was depressed for a second time. Other permutations, e.g., of the order for spinning the reels and the placement of bets also will be apparent after reading the present description.

In addition, other types of interfaces, connectors and links may be used in place of interface 82 and connectors 84. For example, infra-red, radio frequency or other wireless links may be used.

Other variations to the described games also come to mind. For example, the game could be modified such that a player could bet on fewer than all of the display segments. As a further modification, the player could select the particular segment on which he wishes to bet.

Another modification to the game would permit the players to re-spin one or more of the previously stopped display segments. In yet another game variation, instead of betting against the house, players would bet against one another. Also, a double down feature could be added to allow the player to double, or otherwise increase or decrease his bet after the stopping of the first group of reels. Additionally, an insurance wager could be placed e.g. as in a 21 game.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method of playing a game comprising the steps of:

providing a payline display having a plurality of display segments bearing a predetermined number of indicia;

providing a player spin/stop button;

enabling the player spin/stop button for a first time;

depressing the enabled spin/stop button to cause at least some of the plurality of this play segments to "spin", wherein one or more, but not all, of the plurality of display segments thereafter automatically stop spinning;

enabling the player spin/stop button for a second time; and depressing the enabled spin/stop button for the second time to cause at least some of the remaining spinning display segments to stop spinning.

2. The method of claim 1 including the additional step of placing an ante wager prior to the player spin/stop button being enabled for the first time.

3. The method of claim 1 including the additional step of placing a wager prior to the first spin/stop button being enabled for the second time but after said first time.

4. The method of claim 1 wherein the step of placing a bet is performed after the step of depressing the enabled spin/stop button for the first time.

5. The method of claim 1 wherein a dealer is used to perform the steps of enabling the player spin/stop button for a first time.

6. The method of claim 1 wherein a dealer is used to perform the steps of enabling the player spin/stop button for a second time.

7. The method of claim 1 including the additional steps of providing a proposition game wagering area and placing a proposition bet within the proposition game wagering area.

8. The method of playing a game comprising the steps of:

providing a table game apparatus, having a table top with a dealer position and a plurality of player stations located about the table top;

providing on the table top a payline display having a plurality of display segments bearing a predetermined number of indicia;

providing a first spin/stop button;

enabling the first spin/stop button for a first time;

depressing the enabled first spin/stop button to cause at least some of the plurality of display segments to spin, wherein one or more, but not all, of the plurality of display segments thereafter automatically stop spinning, while other of said plurality of display segments continue spinning;

enabling the first spin/stop button for a second time; and depressing the enabled first spin/stop button for the second time to cause at least some of said other display segments to stop spinning.

9. The method of claim 8, including the step of providing additional spin/stop buttons at different stations on the table top, and enabling different spin/stop buttons during different rounds per play, said spin/stop buttons alternately controlling the same plurality of display segments.

10. The method of playing a casino game comprising the steps of:

providing a game apparatus having a payline display and a plurality of display segments bearing a predetermined number of indicia;

providing a spin/stop button;

enabling the spin/stop button for a first time;

depressing the enabled spin/stop button to cause at least some of the plurality of display segments to spin, wherein one or more, but not all, of the plurality of display segments thereafter automatically stops spinning;

thereafter enabling the first spin/stop button for a second time; and thereafter depressing the enabled first spin/stop button for the second time to cause at least some of the other display segments to stop spinning.

11. The method of claim 10, including the additional step of placing a wager prior to the spin/stop button being enabled for the second time.

12. The method of claim 10 including the step of providing additional spin/stop buttons at different stations on said game apparatus, and enabling different spin/stop buttons during different rounds of play, said spin/stop buttons alternately controlling the same plurality of display segments.

13. The method of claim 1 including the step of providing additional spin/stop buttons at different stations on said game apparatus, and enabling different spin/stop buttons during different rounds of play, said spin/stop buttons alternately controlling the same plurality of display segments.

14. A method of playing a game comprising the steps of:

providing a pay line display having a plurality of display segments bearing a predetermined number of indicia;

providing a player's spin/stop button;

enabling a player's spin/stop button for a first time;

depressing the enabled spin/stop button to cause said plurality of display segments to spin;

thereafter automatically causing one or more, but not all, of said plurality of display segments to stop spinning;

thereafter enabling said player's spin/stop button for a second time; and thereafter depressing the enabled spin/stop button for the second time to cause at least some of the remaining spinning display segments to stop spinning.

15. The method of claim 14 including the step of placing a wager subsequent to the time that some of said plurality of the display segments have automatically stopped spinning but prior to said spin/stop button being enabled for the second time.

* * * * *